F. WHITE.
SYSTEM AND APPARATUS FOR TREATING AIR.
APPLICATION FILED JULY 3, 1913.

1,223,331.

Patented Apr. 17, 1917.
7 SHEETS—SHEET 1.

Witnesses:
Howard A. Crossman
Carl L. Choate.

Inventor:
Frederick White.
by Emery, Booth, Janney & Varney
Attys

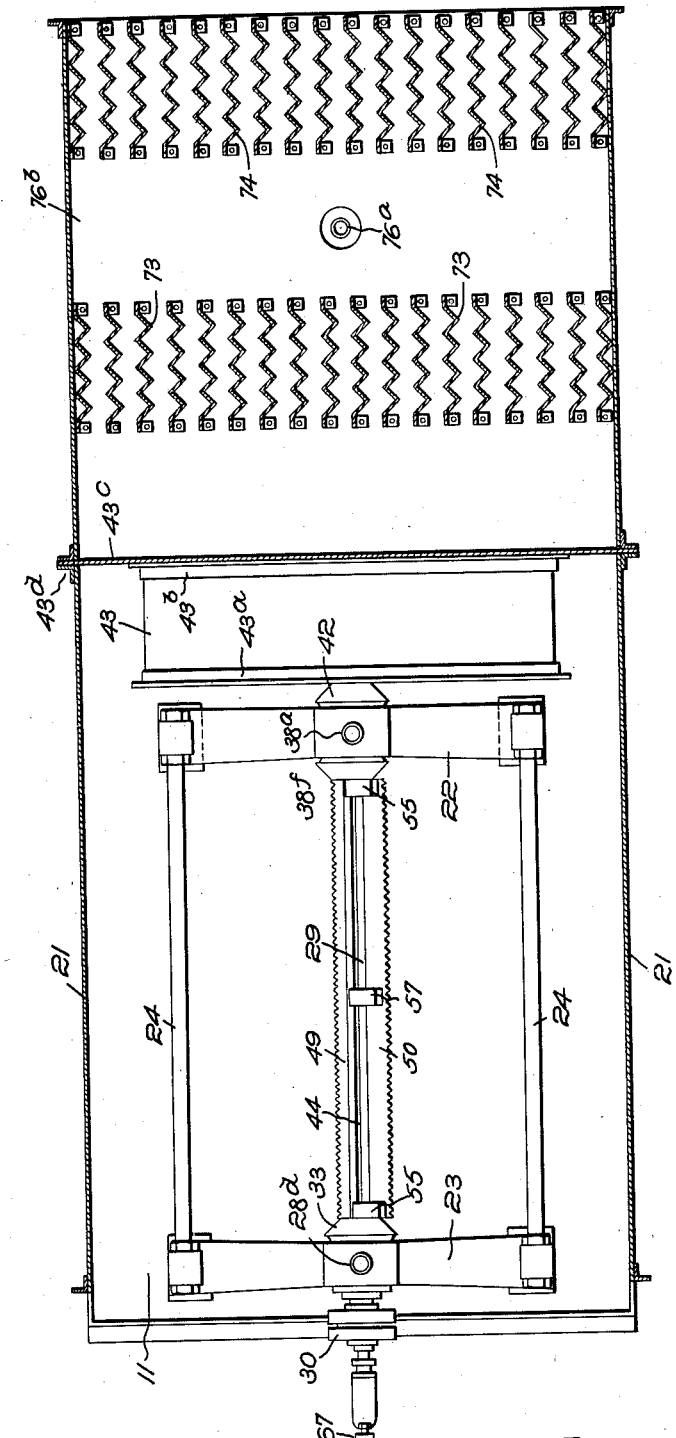

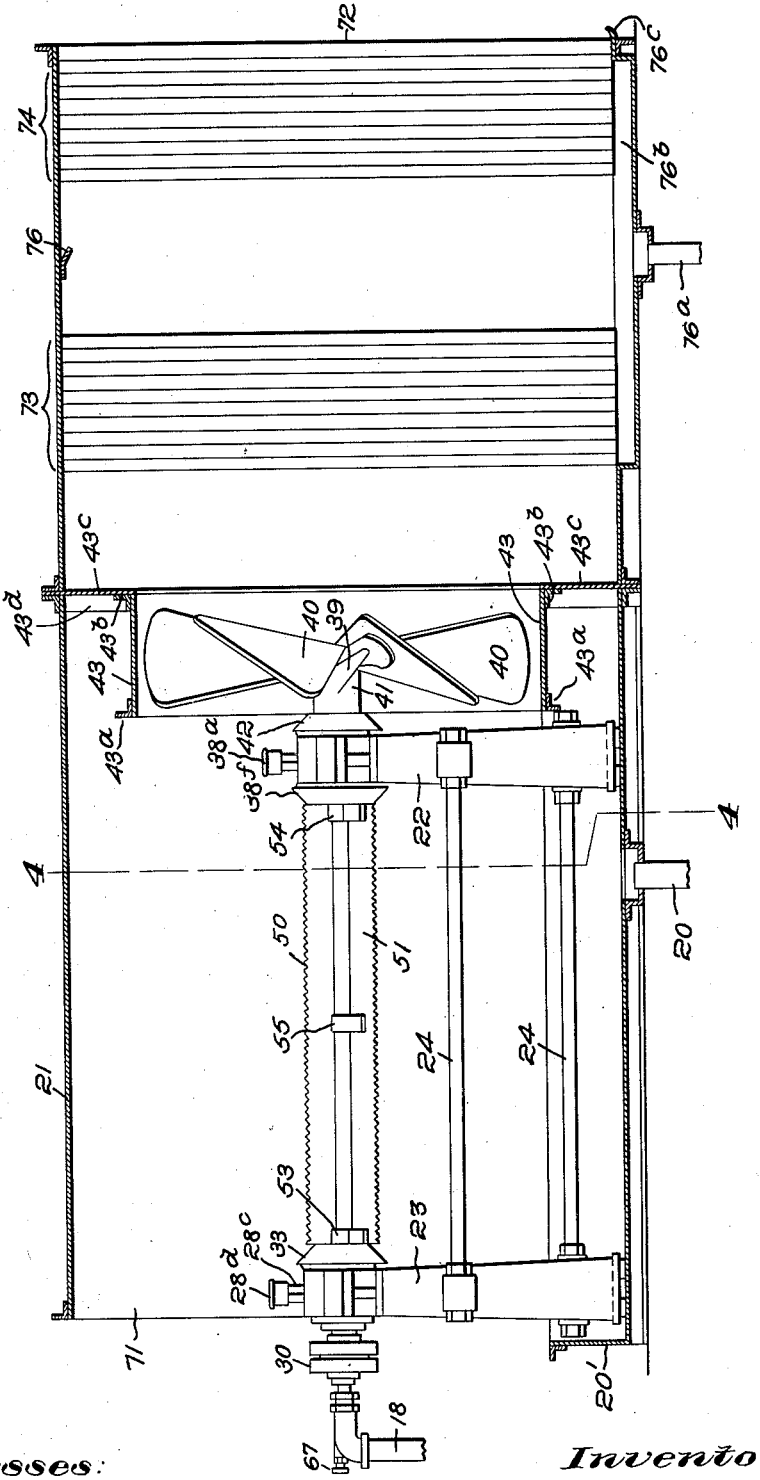

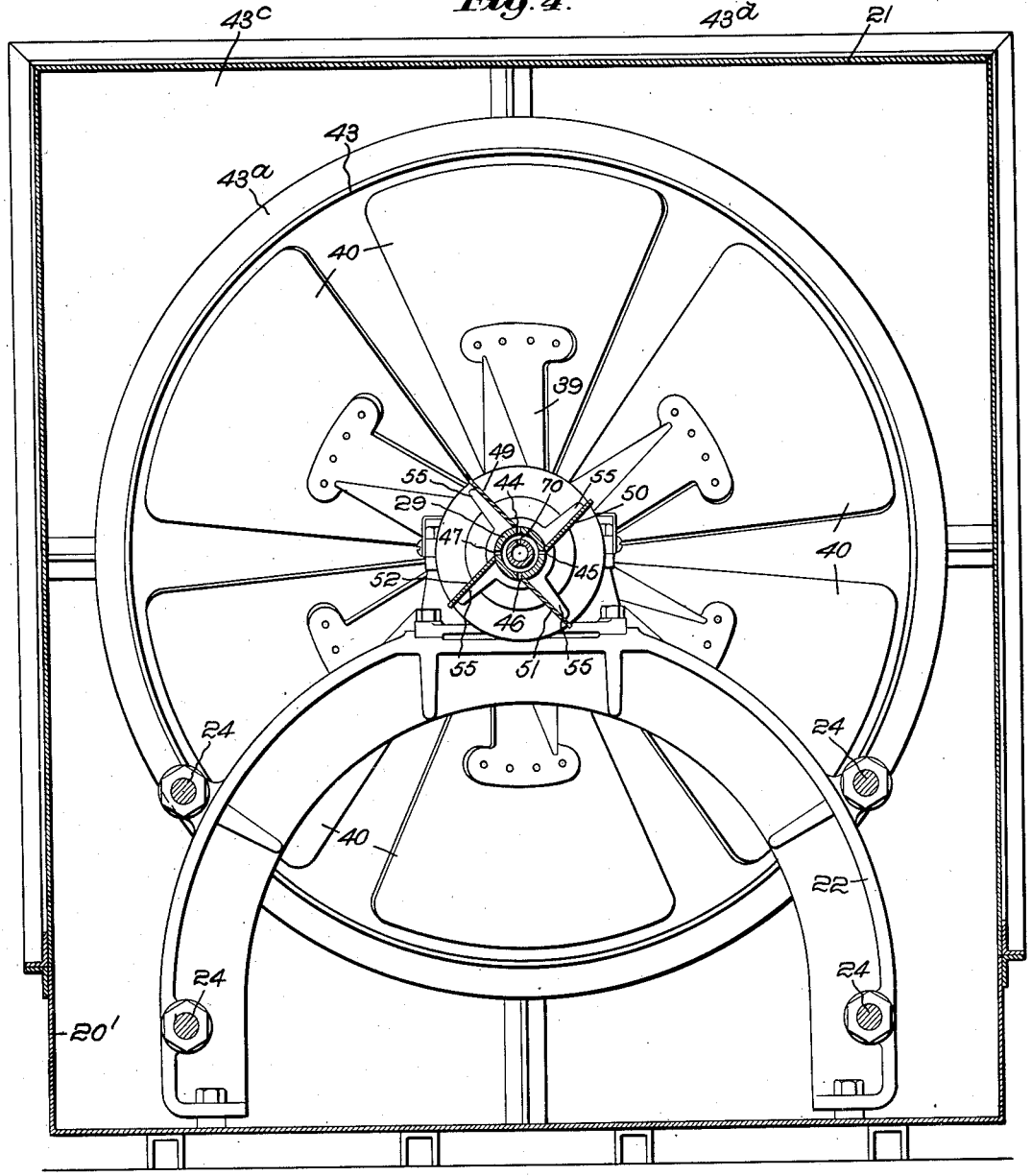

F. WHITE.
SYSTEM AND APPARATUS FOR TREATING AIR.
APPLICATION FILED JULY 3, 1913.
1,223,331. Patented Apr. 17, 1917.
7 SHEETS—SHEET 5.
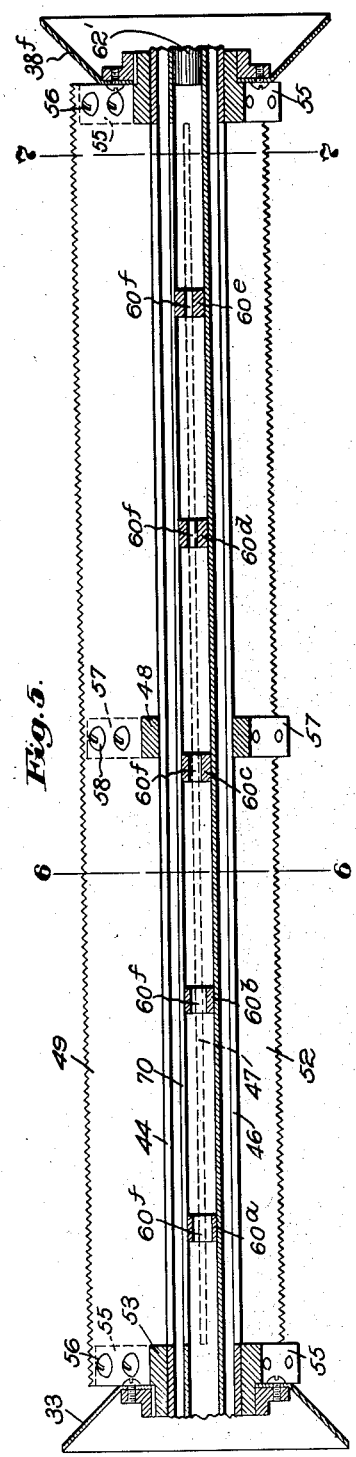
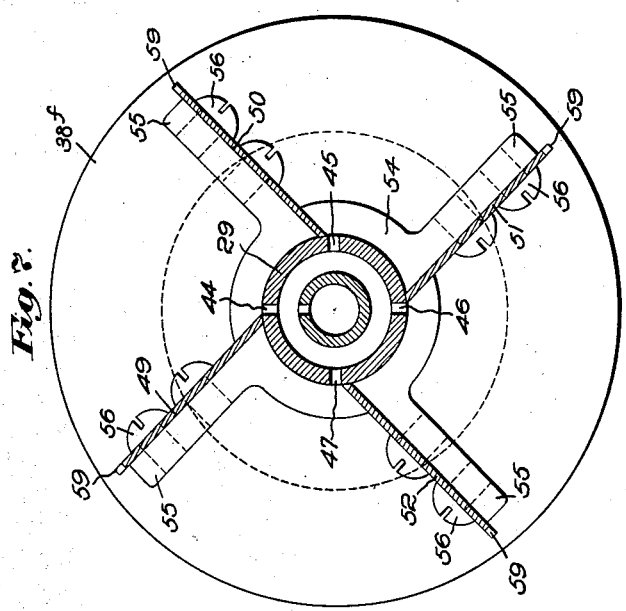
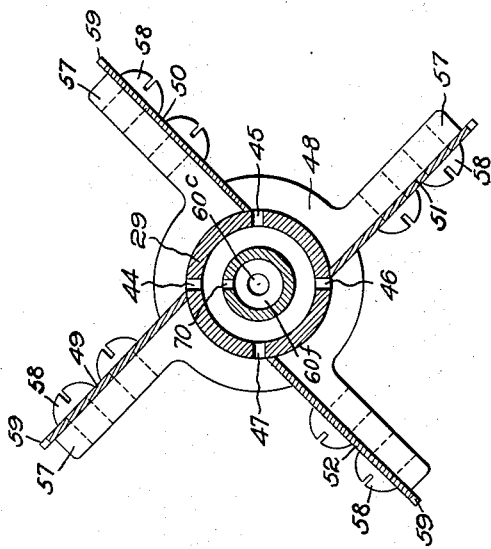
Inventor:
Frederick White.

F. WHITE.
SYSTEM AND APPARATUS FOR TREATING AIR.
APPLICATION FILED JULY 3, 1913.
1,223,331.
Patented Apr. 17, 1917.
7 SHEETS—SHEET 6.
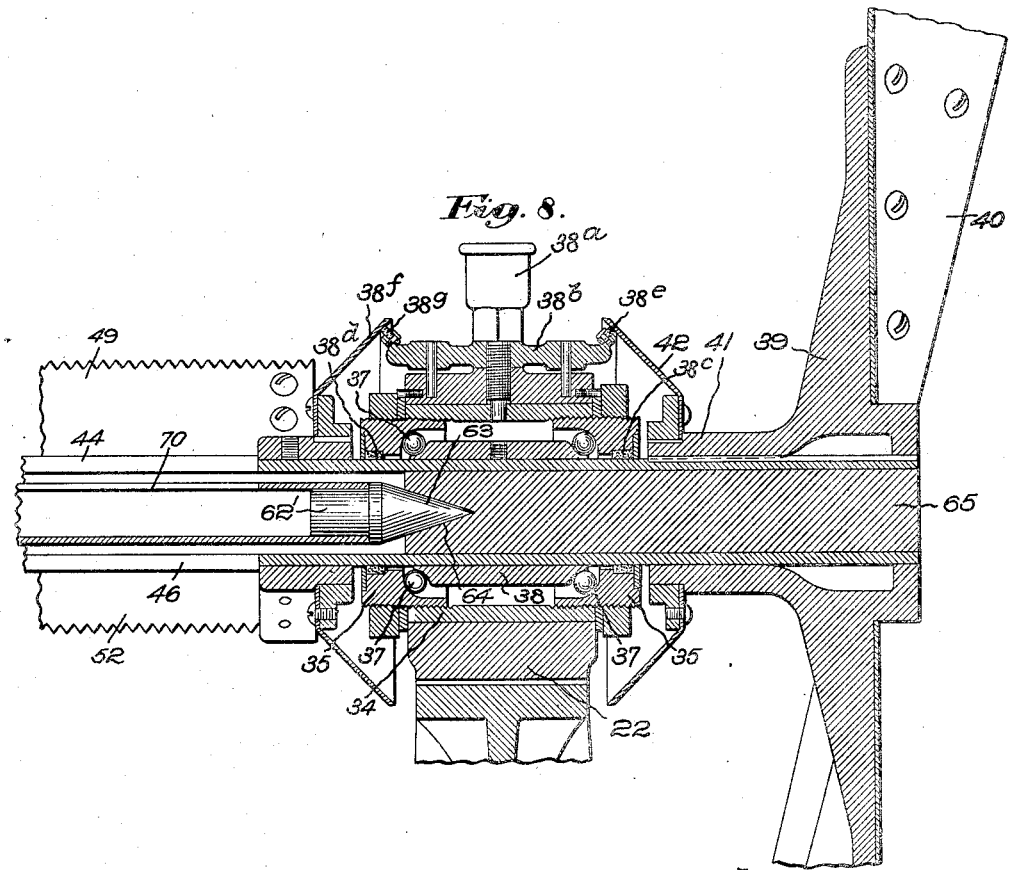
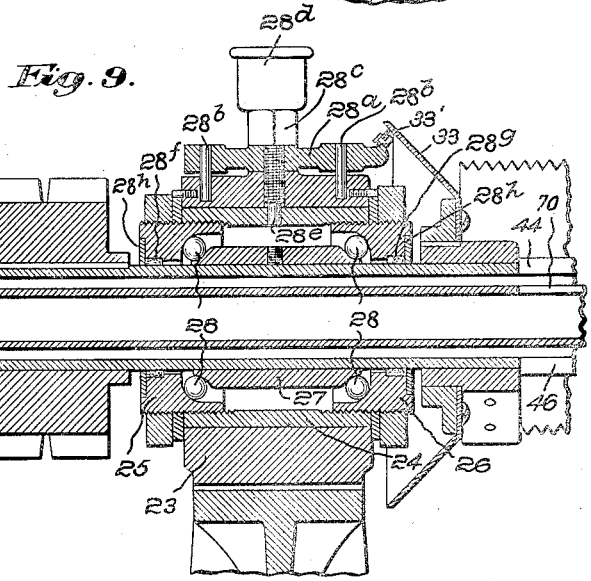
Witnesses:
Horace A. Crossman
Carl L. Choate
Inventor:
Frederick White
by Emery, Booth, Janney and Varney
Attys

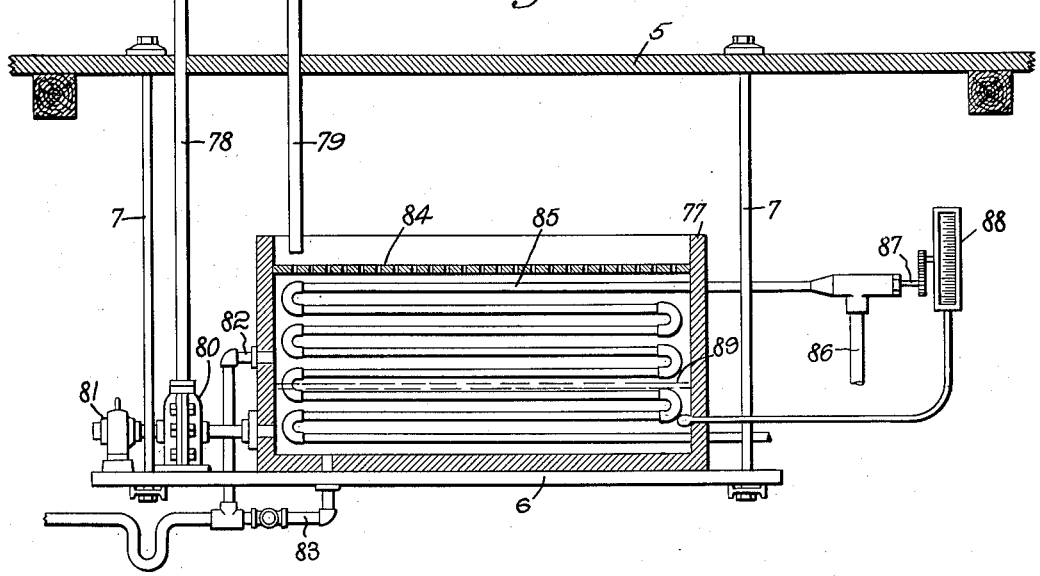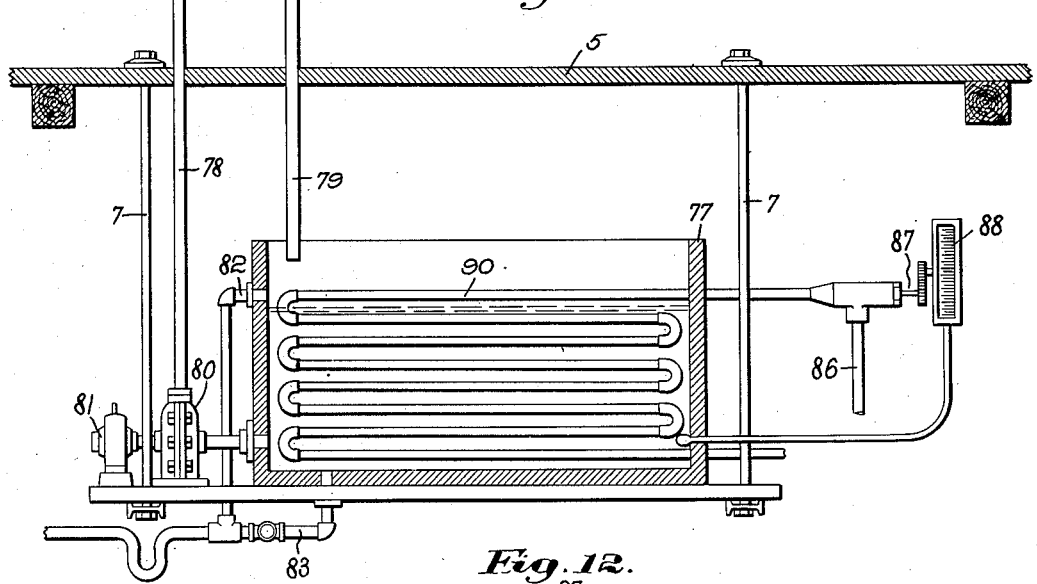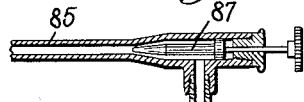

UNITED STATES PATENT OFFICE.

FREDERICK WHITE, OF BROOKLINE, MASSACHUSETTS, ASSIGNOR, BY MESNE ASSIGNMENTS, TO JAMES T. GRAY, OF CAMBRIDGE, MASSACHUSETTS.

SYSTEM AND APPARATUS FOR TREATING AIR.

1,223,331.　　　　Specification of Letters Patent.　　Patented Apr. 17, 1917.

Application filed July 3, 1913. Serial No. 777,168.

*To all whom it may concern:*

Be it known that I, FREDERICK WHITE, a citizen of the United States, and a resident of Brookline, in the county of Norfolk and State of Massachusetts, have invented an Improvement in Systems and Apparatus for Treating Air, of which the following description, in connection with the accompanying drawings, is a specification, like characters on the drawings representing like parts.

This invention relates to a system and apparatus for treating air for the purpose of humidifying, dehumidifying, cooling, refrigerating or purifying the same.

In order that the principle of the invention may readily be understood I have disclosed a single embodiment of the system and apparatus in the accompanying drawings, wherein—

Fig. 2 is a view partially in top plan and partially in horizontal section of that portion of the apparatus wherein the air is treated;

Fig. 3 is a longitudinal section of the apparatus shown in Fig. 2, parts being in side elevation;

Fig. 4 is a vertical section upon the line 4—4 of Fig. 3;

Fig. 5 is a longitudinal vertical section taken through a portion of the apparatus and showing the water discharging and distributing means;

Figure 1:
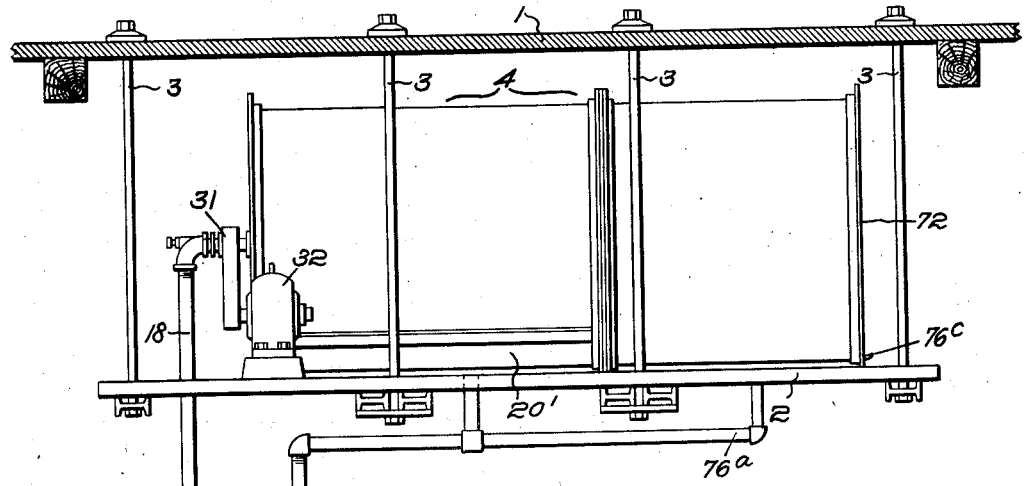
Figure 1 is a side elevation partially in section of one form of apparatus embodying my invention, representing the preferred means for introducing the liquid treating agent, preferably water, thereto, and diagrammatically representing my system.
Figure 1:
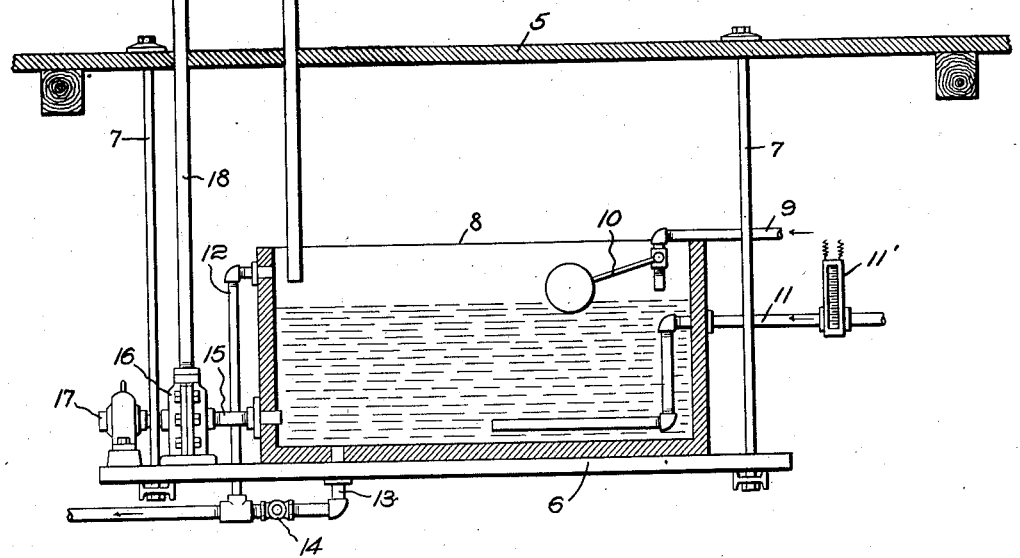

Figs. 6 and 7 are vertical sections upon the lines 6—6 and 7—7 of Fig. 5;

Figs. 8 and 9 are details in vertical section taken through opposite ends of the water discharging means and the supports therefor;

Figs. 10 and 11 represent means for regulating and varying the temperature of the treating agent, and Fig. 12 is a detail showing a form of valve that may be used with the apparatus shown in Figs. 10 and 11.

I have produced a system and apparatus for treating air adapted either to humidify or to dehumidify the same. In accordance with the preferred embodiment of my invention I provide a suitable air treating chamber having an air entrance, and an air exit in communication with the room the air of which is to be treated by humidification, dehumidification, purification or by temperature control, and I provide suitable means for creating a current of air through said chamber. I discharge a suitable liquid treating agent, preferably water, or under certain conditions, brine, into the air passing through said chamber, in any suitable manner, but preferably as hereinafter disclosed, and for the best results I so control the amount of air passing through the chamber per unit of time and also the rate of speed thereof, and the amount of water or other liquid agent discharged into the air, and the manner of its discharge thereinto, as to subject all the air passing through said chamber to treatment by said agent.

In accordance with the preferred embodiment of my invention, all the air discharged from the apparatus is humidified 100%, or in other words, is then in a saturated condition. The apparatus herein disclosed is interchangeably adapted for humidifying and dehumidifying the air and this result I secure, according to the disclosed embodiment of my invention, by regulating and varying the temperature of the water or other liquid agent discharged into the air in said chamber. So far as I am aware, humidifiers have customarily operated with warm water, with the result that not only is the humidity of the room increased, but the temperature thereof is raised. In the use of my apparatus and system I am enabled to humidify with cold water, as for example with water having a temperature of 40° F. thus permitting me not only to humidify the air of the room but also to cool or lower the temperature thereof at the same time. By suitably cooling the water I am enabled to dehumidify the air of the room with which the chamber is in communication and if necessary to purify the same.

The operation of my system and apparatus may be illustrated by a few concrete instances selected merely for purposes of illustration.

If the external air have a temperature of 100° F. and the humidity thereof be 100% or substantially 100%, this means that each cubic foot of air carries 20 grains of water. If the temperature of the mill the air of which is to be treated is 75° F. and carries substantially 100% humidity it will carry 9.3 grains of water for every cubic foot. If now, external air be introduced through the air chamber and discharged into the room of the mill and the air in passing through said chamber is subjected to a spray of water having a temperature of 75° F., the air in passing through the zone of water treatment is deprived of 10.7 grains of water per cubic foot which is condensed in the spray and carried away with the discharge from the sprayed water. Therefore, the air is delivered into the room of the mill at 75° F. and having a humidity of 100%. That is to say, the air discharged into the room carries thereinto 9.3 grains of water per cubic foot.

If the outside temperature of the air is 40° F. and such air is carrying 3 grains of water per cubic foot, (its humidity thus being 100%) and such air is forced through the apparatus, and water at a temperature of 75° F. is discharged thereinto, the air will be discharged from the apparatus into the room at a temperature of 75° F. and having a humidity of 100%, under which conditions it must carry 9.3 grains of water per cubic foot.

Therefore, in the first instance, the apparatus has acted as a dehumidifier because the air is subjected to the action of water having a temperature lower than that of the air to be treated, but in the second case the apparatus has acted as a humidifier inasmuch as the air is subjected to the action of water having a higher temperature than that of the air.

Whatever the temperature of the air that is introduced into the air treating chamber, and whether that air be introduced thereinto from the external atmosphere or from the room whereof the air is to be treated, I humidify or dehumidify air passing through the apparatus by giving a suitable temperature to the water with which the air is treated.

I shall proceed to describe one form of apparatus which constitutes the preferred embodiment of my invention and which is employed as a part of the system. But I desire it to be clearly understood that the water, or other suitable liquid agent, may be discharged into the air otherwise than as herein set forth. It is, however, of great importance that all the air passing through the apparatus be treated by the water, or other liquid agent, and that all the air be discharged from the apparatus having a humidity of 100%.

In carrying out my invention I preferably provide a fan to create an air current through the air treating chamber and I prevent, to a marked degree, the passage of free water or other liquid agent through said fan or through the zone of action thereof, that is to say, of water, or other suitable liquid agent, that has not been absorbed by the current of air. This result may be effected in any suitable manner but I also provide, preferably, in advance of the fan, suitable means such as baffle plates to intercept all water, or other agent, not absorbed by the air and which may be passed through the fan, so that no water or other liquid agent is discharged into the room except that which is held in the form of vapor by the treated air.

Referring particularly to the drawings and to the single embodiment of the invention therein disclosed, and first to Fig. 1, I have therein shown somewhat diagrammatically my system for treating air for the purpose of purifying, humidifying, dehumidifying, cooling or refrigerating the same. Therein I have represented at 1 the flooring of a mill or other structure and at 2 a suitable platform supported by the tie rods 3 from the flooring and upon which the casing of my apparatus, generally indicated at 4, is mounted.

At 5 I have indicated the flooring of the room below and at 6 a suitable platform suspended therefrom by the tie rods 7. Upon the platform 6 is positioned a tank 8 for the water or other liquid treating agent which is to be discharged therefrom into the air treating apparatus 4. It will thus be observed that, in the disclosed embodiment of my invention, the entire apparatus occupies none of the floor space of the mill, but that it is wholly suspended from the flooring of the room above, thus permitting the entire floor space to be availed of for manufacturing or other purposes. Within the scope of my invention, the apparatus may be located at any suitable point.

The space between the floorings 1 and 5 represents a room the air of which is to be treated, either by passing air therefrom through the apparatus or by passing external air into the apparatus and thence into the said room. If the air be taken directly from the room, the rear end of the casing of the apparatus may be in open communication with said room, but if the air be taken in whole or in part from the outer air, or from some source external to the said room, suitable piping may be provided for the purpose.

The tank 8 is adapted to be supplied with water from any suitable source, such as the city mains, by means of a water inlet pipe 9 provided with a cut off float valve 10, or with any other suitable liquid agent. For convenience of description I shall hereinafter generally refer to the liquid agent as water, though I am not limited to its use. Inasmuch as under certain conditions the water is to be delivered into the air treating apparatus 4 at a low temperature, and under other conditions at an elevated temperature, I provide the steam pipe 11 whereby, when desired, steam may be discharged into the water in the tank for elevating the temperature thereof. I also provide a suitable thermostat, diagrammatically represented at 11', controlled in any suitable manner (electrically as indicated or otherwise) and adapted to be set for any desired temperature, so that by the thermostat an even temperature of the water may be maintained for any desired period of time, and so that, when desired, I may from time to time change the temperature thereof. The thermostat is preferably in contact with the water, as shown in Fig. 1, and controls a valve in the steam pipe. The tank is provided with an overflow pipe 12 and also a discharge pipe 13 having a controlling valve 14. I may, as hereinafter described, provide other means particularly adapted for attaining and maintaining a low temperature of the liquid agent, the means represented in Fig. 1 being particularly serviceable when a temperature of 80° F. or higher is desired, it being understood that I may use a liquid agent at any suitable temperature.

In order to convey the water from the tank 8 to the air treating apparatus 4, which latter in this embodiment of my invention is located at a higher level than the tank 8, I provide a pipe 15 in communication with the tank near the bottom thereof and also provide a pump 16 and an electric or other motor 17 for operating the same, such motor being controlled by a suitable rheostat or other device, not shown. By the means shown, or in any other suitable manner, the water is conveyed by the pump 16 into the upright pipe 18 which as shown most clearly in Fig. 9, discharges at its upper end into an elbow pipe or fitting 19 from which it is delivered directly into the apparatus 4. If the tank 8 be located above the apparatus 4, it is evident that the water may be delivered into the said apparatus by gravity. In order to return the used water from the air treating apparatus 4 to the tank 8 I have provided a return pipe 20 communicating at its upper end with a trough 20', which as shown most clearly in Fig. 4, forms the lower portion and bottom of the rear end of the casing of the apparatus 4. The pipe 20 discharges at its lower end into the tank 8.

The air treating apparatus is provided with a casing 21, shown in section in Figs. 3 and 4, and which may be and preferably is of rectangular form. This casing constitutes one form of air treating chamber into which the air is introduced at the rear or left hand end viewing Fig. 1, either from the room in which the apparatus is located, or from any other suitable source, and from which it is discharged at its opposite end, the air being circulated therethrough in any suitable manner. Obviously the form of the casing may be widely varied within the scope of my invention.

Within the casing 21 I provide suitable standards 22, 23, both of which are preferably of semi-circular or arched form as shown in Fig. 4 and are connected together by a series of tie rods 24. It will be observed that the said tie rods 24 are located at points remote from the water discharge pipe hereinafter described, so that they cannot obstruct the discharge of water therefrom but permit the water to be sprayed or discharged unobstructedly in all directions into the air passing through the casing 21; that is, above, below and laterally in both directions.

As shown most clearly in Fig. 9, I provide the upper portion of the standard 23 with a bearing casing 24 wherein are threaded bearing rings 25, 26 supporting a contained bearing collar 27 between which and the bearing rings 25, 26 are antifriction balls 28.

Upon the upper portion of the standard 23 is a suitable curved shielding plate 28$^a$ secured in any suitable manner as by pins 28$^b$ to the standard and extending to any desired extent about the bearing. It is provided with a suitable bolt 28$^c$ threaded thereinto and into the standard. The said bolt is preferably formed as an oil cup 28$^d$ by which oil is constantly fed to the interior of the bearing, through the inner end 28$^e$ thereof. Annular felt or other strips 28$^f$ and 28$^g$ are provided at the ends of the bearing, to exclude the liquid agent therefrom, being held in place by suitable rings 28$^h$.

Any other suitable form of bearing may be provided, but that herein illustrated I have found to be exceedingly effective in operation and particularly adapted for the purpose. The bearing collar 27 is fast upon the water distributing tube or pipe 29, the latter having fast thereon a pulley 30 which as represented in Fig. 1 is driven by belting 31 from a suitable electric or other motor 32 mounted upon the platform 2. Any other suitable driving means for the said pipe or tube 29 may be provided. Adjacent the bearing ring 26, I provide a suitable guard 33, shown as mounted upon the pipe 29 and hence rotatable therewith. Preferably it is of the conical form shown and extends into proximity with the shield 28$^a$, which is provided with a felt or other suitable member 33' of appropriate length and extending circumferentially of the bearing, in contact with said guard, to assist in excluding the liquid agent from the bearing.

The standard 22, as shown most clearly in Fig. 8 is provided with a bearing casing 34 whereinto are threaded the bearing rings 35, 35, preferably generally similar to the bearing rings 25, 26 and supporting through the instrumentality of anti-friction balls 37 the bearing collar 38 fast upon the adjacent end of the said water distributing pipe 29. I preferably provide an oil cup 38ᵃ upon a shield 38ᵇ and felt strip 38ᶜ and 38ᵈ similar to the corresponding parts shown in Fig. 9 and for the same purpose. Fast upon the outer or forward end of the said pipe 29 is a suitable fan 39 having propeller blades 40 bolted thereto and upon the inner end of the hub 41 of the fan is provided a suitable, preferably conical guard 42 extending into proximity to the shield 38ᵇ which latter is preferably provided with the felt strip 38ᵉ similar to the felt strip 33' in Fig. 9 and for the same purpose. I also preferably provide a similar shield 38ᶠ upon the pipe 29 and extending into proximity to a similar felt or other suitable strip 38ᵍ upon the shield 38ᵇ. In this or any other suitable manner I exclude the liquid agent from both bearings. Any other suitable means may be employed to cause a circulation of air through the casing 21.

I preferably provide means to exclude from the fan the water or other liquid agent not held in saturation by the air, in order to prevent the latter in its saturated state, from carrying unabsorbed liquid with it into the room. The best results are secured by excluding all the unabsorbed liquid agent from the fan, but within the scope of my invention less than all the unabsorbed agent may be thus excluded and in practice this may occur. In the event that all such unabsorbed agent is not or may not be excluded from the fan, I provide suitable means, such as baffle plates hereinafter described, to intercept any particles of such agent that may have been carried through the fan. While I may provide any suitable means to exclude unabsorbed liquid agent from the fan, I have in the disclosed embodiment of the invention represented, in Fig. 3, a sleeve or annulus 43 of suitable material, having strengthening rings 43ᵃ and 43ᵇ at its edges and preferably of angled form to insure rigidity. The casing 21 is provided with a suitable transverse partition 43ᶜ of ring-like form to the inner edge of which the sleeve or annulus 43 is secured, as by the ring 43ᵇ. If desired, the partition 43ᶜ may be reinforced by radiating angle pieces 43ᵈ arranged at suitable intervals. The sleeve or annulus 43 is of suitable diameter to inclose the fan 39. The liquid agent not absorbed by the air, or a large proportion thereof, is pocketed in the annular space between the annulus 43 and the surrounding portion of the casing 21 and is deposited on and drains down the outer surface of said annulus and is eventually returned through the pipe 20 into the tank 8. As represented in Fig. 3, the casing 21 may be made in suitable sections.

It will be observed that the water distributing pipe 29 is supported only at points closely adjacent its ends so that the discharge of water therefrom is not interfered with. The said pipe 29 is suitably apertured for the discharge of water and preferably, as shown most clearly in Figs. 5, 6 and 7, is longitudinally slotted throughout its entire length along suitable spaced lines as indicated at 44, 45, 46 and 47. The number of such longitudinal slots may be varied within the scope of my invention and instead of providing longitudinal slots I may provide a suitable number of spaced orifices. For the most efficient operation of the apparatus however, I prefer to provide the continuous slots herein disclosed. Inasmuch as the pipe or tube 29 is frequently of considerable length and the slots 44, etc., are in such case also of considerable length, there is a tendency of the walls of the pipe to sag toward or approach each other particularly at about midlength the pipe. To avoid this, I provide a reinforcing and sustaining ring 48 suitably secured to the pipe between the slots thereof.

The water introduced into the pipe 29 is discharged therefrom through the longitudinal slots 44, etc., and distributed by centrifugal action, but instead of spraying or discharging the water immediately into the air, as may be done in certain embodiments of my invention, I preferably provide adjacent each slot 44, etc., a suitable distributing plate or other means. In Figs. 5, 6 and 7 I have represented a series of such plates at 49, 50, 51 and 52. These plates preferably extend the entire length of the slotted portion of the pipe 29 as shown clearly in Fig. 5, and are arranged at an obtuse angle thereto which I have found in practice productive of the best results. The said plates 49, etc., are supported at their ends by spiders 53, 54 to which the shields 33 and 38ᶠ may be secured, and have arms 55 to which the plates are secured by suitable bolts or screws 56. I also provide the collar 48 with suitable arms 57 to which the said plates are secured by bolts or screws 58.

The outer edges of the said distributing plates 49, etc., are preferably serrated as most clearly shown at 59 in Figs. 6 and 7, in order that the water flowing under centrifugal action along the said plates may be discharged therefrom in a finely comminuted or sprayed condition. The plates 49, etc., preferably extend at their inner edges into close proximity to the corresponding slots 44, etc., as clearly indicated in Figs. 6 and 7, being preferably in contact with the pipe 29.

The water introduced into the elbow or fitting 19 passes therefrom into a suitable discharge pipe 60 as shown most clearly in Fig. 9, and which is provided with a suitable gland 61 and packing 62 to prevent leakage. The pipe 60 is mounted within the discharge pipe 29 and is annularly spaced therefrom as indicated in Figs. 5 to 9 inclusive. At its inner end the said pipe is provided with a plug 62' having a tapering end 63 fitting into a similarly shaped socket 64 in a solid bearing 65 within the outer end of the rotating pipe 29 and which constitutes a closure therefor. The described construction permits the rotation of the distributing pipe 29 at a high speed about the stationary discharge pipe 60. In order to adjust the fitting of the tapering plug 62' within the socket 64, I have as illustrated in Fig. 9, provided an adjusting spindle 66 threaded as indicated at 67 into an internally threaded portion 68 of the fitting or elbow 19. The said spindle 66 bears at its inner end against the end of the pipe 60 thereby to force the plug 62' with the desired degree of tightness into the tapering socket 64.

The discharge pipe 60, as indicated most clearly in Figs. 5, 6 and 7, is provided with a longitudinal slot 70 of preferably the full length of each of the slots 44, etc., whereby the water is discharged from said pipe into the annular space between the same and the pipe 29, from which it is discharged through the slotted openings 44, etc., and is then distributed in a comminuted condition from the serrated edges of the rapidly rotating plates 49, 50, 51 and 52.

Within the scope of my invention the water, or other liquid agent may be introduced into the pipe 60 from either end but preferably I introduce it at the end opposite the fan 39. I have, however, discovered that when the water or other agent is introduced at the end opposite the fan 39, the said agent is apt to be unequally discharged through the slot 70 and therefore to be unequally distributed through the slots 44, 45, 46 and 47 of the pipe 29. I attribute this unequal discharge in part to the action of the fan 39 which tends to draw the said agent toward it. I therefore, provide means to effect the equalization of the distribution of the liquid agent through the air treating chamber. This result I may accomplish in any suitable manner but preferably by placing at suitable intervals in the pipe 60, a series of plugs, 60ª, 60ᵇ, 60ᶜ, 60ᵈ and 60ᵉ. These plugs are of any suitable number and placed any suitable distance apart and each is provided with one or more perforations, as indicated at 60ᶠ permitting the passage of the liquid agent therethrough. The plug 60ª is provided with the largest perforation and the other plugs are provided with perforations of successively smaller area in the order specified, whereby plugs that are the more remote from the liquid receiving end of the pipe 60 permit a lesser quantity of fluid to pass therethrough than do the plugs nearer the said receiving end. In this manner the distribution of the liquid agent is equalized. Obviously, I may employ said plugs or other suitable means if the liquid agent be introduced through the opposite end of the pipe 60 and in such case the relative size of the perforations is the reverse of that herein shown.

Although the centrifugal distribution of water in the manner described I have found to be extremely efficient in practice, I desire it to be clearly understood that my system may be carried out and practised with apparatus wherein the water is discharged and distributed in any other suitable manner. In other words, the system herein disclosed is not dependent in operation upon the particular water distributing apparatus herein disclosed, though I have found the latter to be most efficient in actual use.

The air to be treated is drawn into the open, rear end 71 of the casing 21 as indicated most clearly in Fig. 3 and from any suitable source, and is discharged through the front end 72 thereof. In order to prevent wholly, or substantially wholly, the discharge of free water through the front of the casing, that is to say, water not of saturation, and which may have in small quantities been carried through the fan 39, I have provided in this embodiment of the invention, two series of baffle plates as indicated at 73 and 74. Any suitable liquid intercepting device may, however, be provided. Each of these series is made up of plates 75 extending preferably vertically from the top to the bottom of the casing and of a general zigzag or W-form as there illustrated. The air is conveyed between the plates 75 and any water which has not been absorbed by the air but which is merely driven along by the current in a free condition, is arrested by the said baffle plates and is thereby prevented from being discharged into the room in the form of drops. I may, if desired, provide a suitable deflecting plate 76 secured to the inner surface of the casing between the two series of deflecting plates and which directs the saturated air slightly downwardly toward the series of plates 74 and also prevents any water that may have been deposited upon the interior of the casing from flowing to the discharge end of the apparatus.

I provide a suitable drip or return pipe 76ª communicating with the depressed portion 76ᵇ of the portion of the casing below said baffle plates 73—74 and by means of which the water or other liquid agent intercepted by said baffle plates is returned to the tank 8. At the lower portion of the forward edge of the casing 21 I may provide an upwardly directed lip 76ᶜ to prevent the escape of any water or other liquid agent at this point and to compel its return to the tank 8.

I have previously stated that the temperature of the water or other liquid agent may be varied and that I provide suitable means for varying the temperature thereof from time to time as may be desired, and for maintaining the temperature of the agent at the desired point. In Fig. 1 I have represented a convenient form of apparatus by which a temperature of from substantially 80° F. to substantially 212° F. may be secured and maintained. In such case, the liquid agent preferably employed is water and such agent is preferably heated by the introduction of steam in the manner already described.

In Figs. 10 and 11 I have represented a convenient form of apparatus for securing and maintaining the liquid agent at desired temperatures below 80° F. In Fig. 10 I have represented an apparatus particularly intended to secure and maintain any desired temperature between substantially 40° F. and 80° F. Therein I have shown a tank 77 substantially similar, it may be, to the tank 8 shown in Fig. 1 and represented as supported in a similar manner. This tank is in communication with the casing 21 of the air treating chamber by pipes 78—79 similar to the corresponding pipes 18—20 in Fig. 1. I also provide a pump 80 and a suitable electric or other motor 81 for forcing the liquid agent into the casing 21. I may also provide an overflow pipe 82 and a discharge pipe 83. The liquid agent, preferably water, returned from the casing 21 is discharged from the pipe 79 on to a perforated partition 84 through which it trickles on to and from the pipe coils 85 positioned in the tank in any suitable number and through which some suitable cooling agent, such for example as ammonia, is circulated so as to cool the liquid agent to the desired extent. The ammonia or other cooling agent is introduced through a pipe 86 and its discharge into the coils 85 is controlled by a suitable needle valve 87 shown in detail in Fig. 12 and which itself is controlled by a suitable thermostatic device indicated at 88. This control of the valve by the thermostatic device may be effected in any suitable manner not herein necessary to describe. The water level is herein indicated at 89 and may be maintained at any suitable point, preferably substantially below the top of the coils 85 so as to permit the water to trickle on to and from said coils.

In Fig. 11 I have represented a similar apparatus by which I may secure and maintain any desired temperature of the liquid agent between substantially minus 28° F. and plus 40° F. In such case, the liquid agent is preferably chlorid of calcium brine and the cooling agent therefor is preferably ammonia which is introduced through the pipe 86 into suitable coils 90 located in the tank 77 and by which the desired temperature of the brine is secured. In order to control the flow of the ammonia and thereby to vary the temperature of the brine, I provide a needle valve 87 similar to that previously described and automatically controlled by a thermostatic device best shown in Fig. 11.

It will be evident from the foregoing description that the temperature of the liquid agent, which is preferably either water or brine, may be maintained at any desired point between substantially minus 28° F. and plus 212° F. according as it may be desired to effect humidifying, dehumidifying, cooling or refrigeration of the air. As previously stated, the air may be introduced into the casing either from the room the air of which is to be treated, or from the external air or other source external to the room. I contemplate, according to the preferred embodiment of my invention, the saturation of all the air passing through the air treating chamber and I prevent to a very marked degree, and preferably wholly, the discharge into the room with the saturated air of any liquid agent not in an absorbed condition. I have secured the best results by the employment of the centrifugal apparatus herein shown for saturating the air but within the scope of my invention and in the carrying out of my system, any other suitable air treating apparatus may be employed.

Having thus described one illustrative embodiment of my invention, I desire it to be understood that although specific terms are employed, they are used in a generic and descriptive sense and not for purposes of limitation, the scope of the invention being set forth in the following claims.

Claims:

1. A system for treatment of air comprising in combination a room, an air treating chamber having an entrance, and an exit in communication with said room, air current producing means for said chamber, and means to effect dehumidification of the air in said chamber by the discharge of a liquid agent thereinto in said chamber, including a pipe located in said chamber and having openings between its ends, and rotating means for said pipe to effect an even distribution of liquid substantially throughout said chamber.

2. A system for air treatment comprising in combination a room, an air treating chamber having an entrance, and an exit in communication with said room, air current producing means for said chamber, means to discharge a liquid agent into the air in said chamber, said means extending longitudinally of the chamber and rotatable to discharge liquid centrifugally thereto, rotating means for said means to discharge liquid agent, and means to extract moisture from or inject moisture into the air of said room by regulation of the temperature of the said agent.

3. Apparatus for treating air comprising in combination an air treating chamber, means to move air therethrough, means to saturate the air in said chamber, means to exclude liquid, in excess of the liquid of saturation, from passage through the air moving means and means in advance of said air moving means to exclude liquid not of saturation from exit from said chamber.

4. Apparatus for treating air comprising in combination an air treating chamber, a fan to move air therethrough, means to saturate the air in said chamber, means to exclude liquid, in excess of the liquid of saturation, from passage through the fan and means in advance of said air moving means to exclude liquid not of saturation from exit from said chamber.

5. Apparatus for treating air comprising in combination an air treating chamber, a fan to move air therethrough, means to discharge streams of a liquid agent into said air, and means in proximity to said fan providing an air pocket to receive the unabsorbed agent and to exclude it from the fan.

6. Apparatus for treating air comprising in combination an air treating chamber, current producing means to move air therethrough, means to discharge a liquid agent into said air, means to exclude liquid from the current producing means, and means beyond the current producing means to intercept liquid not of saturation.

7. Apparatus for treating air comprising in combination an air treating chamber, current producing means to move air therethrough, means to discharge a liquid agent into said moving air, means anterior to said current producing means to exclude liquid from the current producing means, and means posterior to said current producing means to intercept liquid not of saturation.

8. Apparatus for treating air comprising in combination an air treating chamber, current producing means to move air therethrough, means to discharge a liquid agent into said moving air, and means functioning prior to such discharge of said agent to equalize the distribution of said agent through said chamber.

9. Apparatus for treating air comprising in combination an air treating chamber, current producing means to move air therethrough, means centrifugally to discharge a liquid agent into said moving air, and means functioning prior to such centrifugal discharge to equalize the distribution of the discharging agent.

10. Apparatus for treating air comprising in combination an air treating chamber, current producing means to move air therethrough, means to discharge a liquid agent across the path of the moving air and means to equalize the discharge of said agent throughout the length of the zone of distribution thereof.

11. Apparatus for treating air comprising in combination an air treating chamber, current producing means to move air therethrough, means extending in the direction of movement of the air through the chamber to discharge a liquid agent into a surrounding zone of moving air, and means to equalize the discharge of said agent throughout said zone.

12. Apparatus for treating air comprising in combination an air treating chamber, a fan to move air therethrough, and a liquid agent discharge pipe spaced from the surrounding walls of the chamber and having discharge orifices, and means within said pipe to equalize the discharge of said agent therefrom.

13. Apparatus for treating air comprising in combination an air treating chamber, a fan to move air therethrough, a liquid agent pipe within the chamber having discharge orifices, and spaced, perforated partitions within said pipe to equalize the discharge of said agent therefrom.

14. Apparatus for treating air comprising in combination an air treating chamber, a fan to move air therethrough, a liquid agent discharge pipe extending longitudinally of said chamber, and rotary means surrounding said pipe to control the discharge of said agent therefrom.

15. Apparatus for treating air comprising in combination an air treating chamber, a fan to move air therethrough, a stationary liquid agent discharge pipe in said chamber, and rotary means surrounding said pipe to control the distribution of said agent therefrom.

16. Apparatus for treating air comprising in combination an air treating chamber, a fan to move air therethrough, a liquid agent pipe in said chamber, and centrifugally acting liquid agent distributing means surrounding said pipe.

17. Apparatus for treating air comprising in combination an air treating chamber, means to move air therethrough, a liquid agent discharge pipe extending longitudinally of said chamber, and a slotted, rotary distribution-controlling pipe surrounding and spaced from the agent discharge pipe.

18. Apparatus for treating air comprising in combination an air treating chamber, means to move air therethrough in a longitudinal direction, liquid agent discharging means in said chamber acting to discharge said agent transversely into said moving air, plates to receive the agent from said discharging means and to distribute the same into the air in said chamber, and means to subject said plates to an agent distributing movement.

19. Apparatus for treating air comprising in combination an air treating chamber, current producing means to move air longitudinally therethrough, liquid agent discharging means in the chamber acting to discharge said agent transversely into said moving air, means to rotate said discharging means to effect a centrifugal distribution of the agent into the chamber, and plates on to which the said agent is discharged and from which the agent is centrifugally distributed.

20. Apparatus for treating air comprising in combination an air treating chamber, a fan to move air therethrough, a liquid agent discharge pipe within said chamber, a perforated, rotary pipe surrounding said agent discharge pipe between it and the moving air current and distributing plates carried by said rotary pipe.

21. Apparatus for treating air comprising in combination an air treating chamber, a fan to move air therethrough, a liquid agent discharge pipe within said chamber, a perforated, rotary pipe surrounding said agent discharge pipe, and distributing plates carried by said rotary pipe, and having serrated distributing edges.

22. Apparatus for treating air comprising in combination an air treating chamber, a fan to move air therethrough, a liquid agent discharge pipe within said chamber, a perforated, rotary pipe surrounding said agent discharge pipe, distributing plates carried by said rotary pipe, and means to equalize the flow of the liquid agent onto said plates throughout the length of said pipe.

23. Apparatus for treating air comprising in combination an air treating chamber, a fan to move air therethrough, a liquid agent discharge pipe in said chamber, a rotary, perforated pipe surrounding the discharge pipe between it and the fan-induced air current, and distributing plates carried by said outer pipe and inclined to the periphery thereof.

24. Apparatus for treating air comprising in combination an air treating chamber, a fan to move air therethrough, a liquid agent discharge pipe in said chamber, a rotary, perforated pipe surrounding the discharge pipe in close proximity thereto, and distributing plates carried by said outer pipe and inclined to the periphery thereof.

25. Apparatus for treating air comprising an air treating chamber, a fan to move air longitudinally therethrough, means to effect the centrifugal discharge of a liquid agent transversely into said moving air, and plates positioned to receive the centrifugally discharged agent and from which the ultimate discharge of the agent into the moving air takes place.

26. Apparatus for treating air comprising an air treating chamber, a fan to move air therethrough, means to effect the centrifugal discharge of a liquid agent into said moving air, and plates positioned to receive the centrifugally discharged agent and from which the ultimate discharge of the agent into the moving air takes place, said plates having means to effect the separation of the centrifugally discharged agent into finely divided streams.

27. An apparatus for treating air comprising in combination an air treating chamber, a fan to move air therethrough, and means to effect the discharge of a substantially continuous sheet of liquid transversely into the path of the moving air.

28. Apparatus for treating air comprising in combination an air treating chamber, means to move air longitudinally therethrough, plates extending longitudinally of said chamber for distributing a liqud agent, and means to cause said agent to flow by centrifugal action onto, across and from said plates transversely into such moving air.

29. Apparatus for treating air comprising in combination an air treating chamber, means to move air therethrough, plates for distributing a liquid agent, means to cause said liquid agent to flow by centrifugal action onto, across and from said plates, and means to comminute the agent as it is discharged from the plates.

30. Apparatus for treating air comprising in combination an air treating chamber, an air current producing fan located therein, a liquid agent discharge pipe within and extending longitudinally of said chamber and having discharge means between its ends, means to admit said liquid into the end of the pipe the more remote from said fan, and means to equalize the discharge of said liquid from said pipe.

31. Apparatus for treating air comprising in combination an air treating chamber open at both ends and having positioned therein a longitudinally extending liquid agent discharge pipe having discharge means between its ends, an air current producing fan, and a series of baffle plates, said pipe, fan and plates being in sequence, and means to equalize the discharge of liquid from said pipe.

32. Apparatus for treating air comprising in combination an air treating chamber open at both ends and having positioned therein a longitudinally extending liquid agent discharge pipe having discharge means between its ends, an air current producing fan, and a series of baffle plates, said pipe, fan and plates being in sequence, means to equalize the discharge of liquid from said pipe, and means to exclude liquid not of saturation from passage through said fan.

33. Apparatus for treating air comprising in combination an air treating chamber having entrance and exit ends and having positioned therein in sequence, inner and outer liquid discharging and distributing pipes, a fan, and a series of baffle plates.

34. Apparatus for treating air comprising in combination an air treating chamber having an apertured, stationary, liquid discharge pipe extending longitudinally thereof, an apertured liquid distributing pipe surrounding the discharge pipe, a fan carried by said distributing pipe, and means to rotate the distributing pipe.

35. Apparatus for treating air comprising in combination an open ended air treating chamber, a fan to move air therethrough, a liquid discharge pipe extending longitudinally of the chamber substantially centrally thereof, and supporting means for said pipe permitting an uninterrupted discharge in all directions substantially radially of the pipe.

36. An apparatus for treating air comprising in combination an open ended air treating chamber, a fan to move air therethrough, a longitudinally extending liquid discharge pipe in said chamber, and supporting means for said pipe permitting an uninterrupted discharge of liquid therefrom above, below, and laterally of said pipe.

37. Apparatus for treating air comprising in combination an air treating chamber, a fan therein, a liquid discharge pipe therein, and a rotary pipe surrounding said liquid discharge pipe, apertured to effect the centrifugal distribution of liquid therefrom.

38. Apparatus for treating air comprising in combination an air treating chamber, a fan therein, a slotted liquid discharge pipe in the chamber, and a slotted, rotary pipe surrounding the discharge pipe and through which the liquid is centrifugally distributed.

39. Apparatus for treating air comprising in combination an air treating chamber, a fan therein, a slotted liquid discharge pipe in the chamber, a slotted, rotary pipe surrounding the discharge pipe and through which the liquid is centrifugally distributed, and plates receiving liquid from said pipes and from which it is distributed into the moving air.

40. Apparatus for treating air comprising in combination an air treating chamber, a fan therein, a slotted liquid discharge pipe in the chamber, a slotted, rotary pipe surrounding the discharge pipe and through which the liquid is centrifugally distributed, and liquid distributing plates onto which the liquid is discharged by said pipes.

41. Apparatus for treating air comprising in combination an air treating chamber, a fan therein, a slotted liquid discharge pipe in the chamber, a slotted, rotary pipe surrounding the discharge pipe and through which the liquid is centrifugally distributed, plates receiving liquid from said pipes and from which it is distributed into the moving air, and means to equalize the flow of liquid onto said plates.

42. Apparatus for treating air comprising in combination an air treating chamber, rotary means positioned therein for discharging a liquid agent into the chamber, a liquid agent supply pipe adapted to discharge within said rotary means, bearings for said rotary discharge means, and means to exclude the liquid agent from said bearings.

43. Apparatus for treating air comprising in combination an air treating chamber, a fan therein, an apertured liquid distributing pipe in said chamber, a liquid supply pipe adapted to discharge within said distributing pipe, means to rotate the same, bearings for said pipe, and means to exclude the liquid agent from said bearings.

44. An apparatus for treating air comprising in combination an air treating chamber, a fan to move air therethrough, a hollow means to discharge a liquid agent into said air, a liquid air supply pipe adapted to discharge within said hollow means, and means surrounding said fan to receive deposit of the unabsorbed liquid agent and to drain it from the fan.

45. Apparatus for treating air comprising in combination an air treating chamber, a fan to move air therethrough, means to discharge a liquid agent into said chamber, and a sleeve surrounding said fan and coöperating with the walls of said chamber to exclude the unabsorbed liquid agent from the fan.

46. Apparatus for treating air comprising in combination an air treating chamber, a fan to move air therethrough, means to discharge a liquid agent into said chamber, a sleeve surrounding said fan and coöperating with the walls of said chamber to exclude the unabsorbed liquid agent from the fan, and means beyond the fan to intercept the unabsorbed agent passing through the fan.

47. Apparatus for treating air comprising in combination an air treating chamber, a fan to move air therethrough, means to discharge a liquid agent into said chamber, a sleeve surrounding said fan to exclude the unabsorbed liquid agent from the fan, means beyond the fan to intercept the unabsorbed agent passing through the fan, and a device coöperating with said intercepting means to prevent the discharge of the unabsorbed agent from the apparatus.

48. Apparatus for treating air comprising in combination an air treating chamber, a fan to move air therethrough, the plates of said fan being spaced from the surrounding walls of said chamber, means to discharge a liquid agent into the air in said chamber, and a sleeve surrounding said fan but closely adjacent thereto and spaced from the fan surrounding walls of the chamber, thereby to provide a pocket to receive the unabsorbed liquid agent.

49. Apparatus for treating air comprising in combination an air treating chamber having a longitudinally extending liquid agent discharge pipe therein provided with discharge openings between its ends, a fan and baffle plates in said chamber, said pipe, fan and baffle plates being arranged in sequence.

In testimony whereof, I have signed my name to this specification, in the presence of of two subscribing witnesses.

FREDERICK WHITE.

Witnesses:
IRVING U. TOWNSEND,
ROBERT H. KUMMLER.